April 18, 1967    S. R. ZIMMERLEY ET AL    3,314,783
PROCESS FOR THE RECOVERY OF MOLYBDENUM VALUES FROM
FERRUGINOUS, MOLYBDENUM-BEARING SLAGS
Filed May 6, 1963
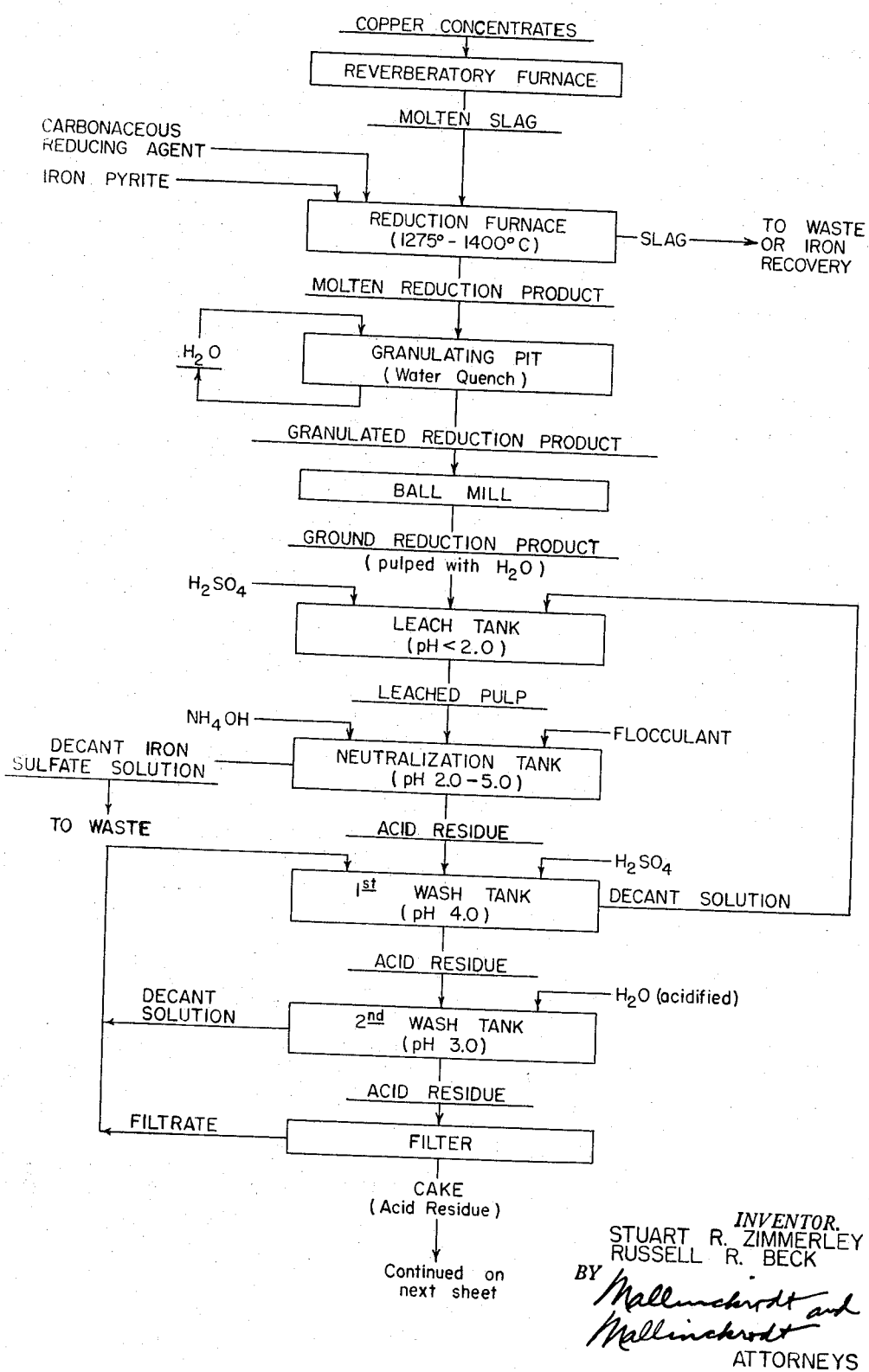
INVENTOR.
STUART R. ZIMMERLEY
RUSSELL R. BECK
ATTORNEYS

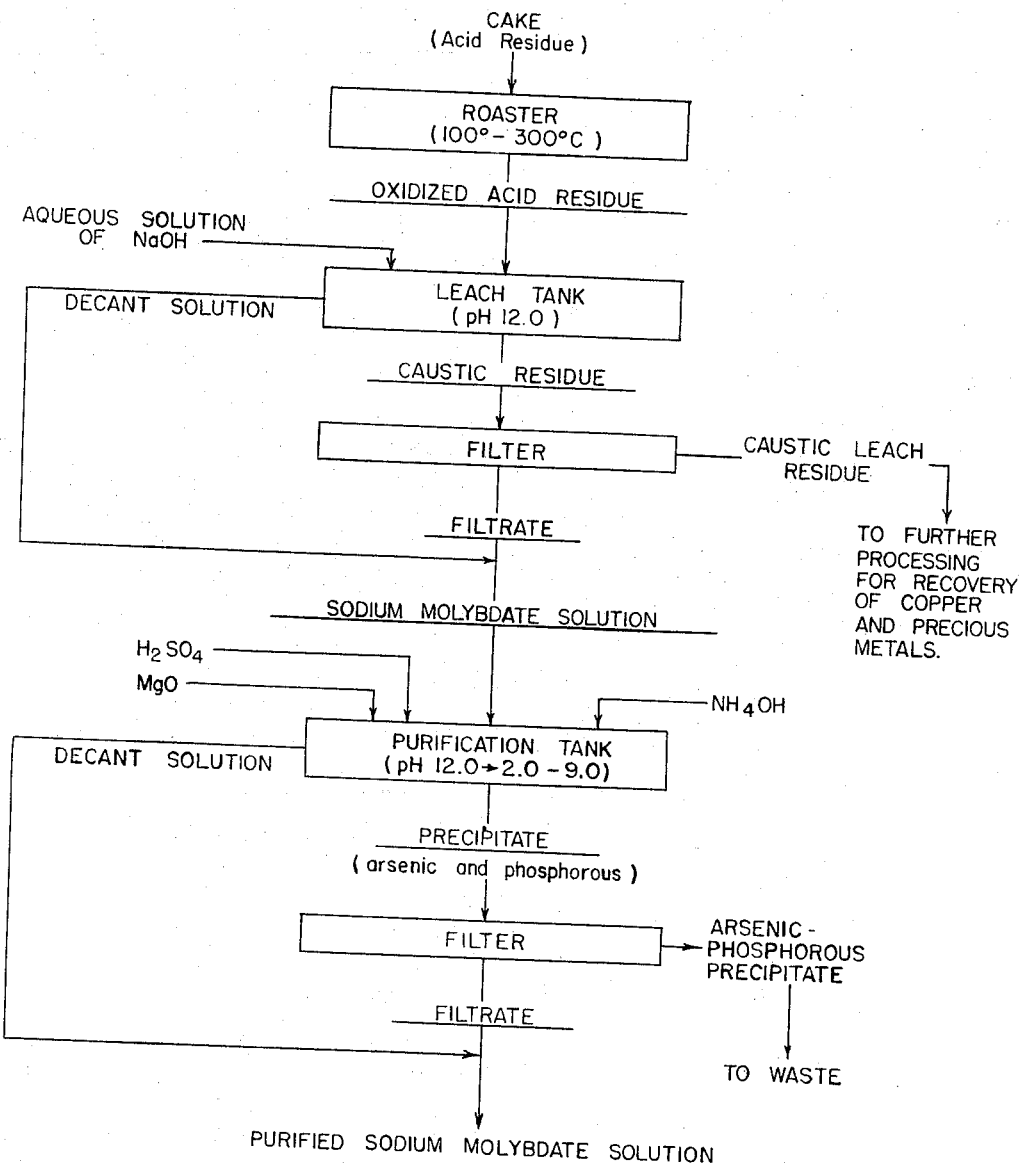

United States Patent Office 3,314,783
Patented Apr. 18, 1967

3,314,783
PROCESS FOR THE RECOVERY OF MOLYBDENUM VALUES FROM FERRUGINOUS, MOLYBDENUM-BEARING SLAGS
Stuart R. Zimmerley and Russell R. Beck, Salt Lake City, Utah, assignors to Kennecott Copper Corporation, New York, N.Y., a corporation of New York
Filed May 6, 1963, Ser. No. 278,096
26 Claims. (Cl. 75—108)

This invention relates to the arts of pyrometallurgy and hydrometallurgy and is concerned with providing a practical process for recovering useful, molybdenum-containing products from ferruginous, molybdenum-bearing slags.

Copper concentrates often contain small percentages of molybdenum, due to the lack of selectivity in flotation processes used for the separation of molybdenite and sulfide copper minerals or because the amount of molybdenum in the original ore did not warrant the application of a special process for the recovery of the molybdenite. In smelting these concentrates by conventional methods, a major part of the contained molybdenum is collected in the reverberatory furnace slag, which is normally discarded as a waste product.

It is for these slags that the invention was developed, but it is applicable to any slag containing a significant amount of molybdenum. Thus, slags obtained by the smelting or melting of any molybdenum-bearing material can be successfully treated by the process of this invention.

In accordance with the invention, it has been discovered that the molybdenum in a molten slag or other iron and molybdenum-bearing material can be reduced preferentially to the iron by subjecting the material to a reduction smelting operation involving heating the material together with a reducing agent, the operation being controlled with respect to the quantity of reducing agent employed, the temperature, and the time, or to any of these. Thus, it has been discovered that the molybdenum is reduced preferentially to the iron if less than enough reducing agent to reduce the iron is employed, or if, when more than enough reducing agent is employed, either the time or the temperature or both are limited to effect reduction of most of the molybdenum and little of the iron. Highest selectivity is obtained, however, by judicious control of all three factors in any given instance. Although one or more of these factors may be the subject of control as above indicated relative to the others, maintained on a conventional basis, it will be apparent that all three are established in any given instance to produce preferential reduction of the molybdenum relative to the iron.

The reduced molybdenum is selectively extracted from the slag which results from the smelting operation and is collected by and concentrated in a metallic reduction product, which is drawn off separately from the slag. This product is preferably cooled rapidly, as by water quenching, to place it in granulated or other finely divided condition for subsequent treatment. As a metallurgical product in and of itself, it constitutes a molybdenum concentrate from which the molybdenum values can be extracted.

If, in rare instances, insufficient iron is naturally present in the slag to collect, in a metallic reduction product, molybdenum contained in the slag, metallic iron or a material containing iron in an oxidized state should be added to the reduction furnace charge. Also, it is preferable to add to the furnace charge a sulfur-bearing material in order to produce a final, solidified reduction product comprising very fine metallic particles dispersed throughout a brittle, metallic sulfide matrix, as in the case of the dispersed iron product of copending application for U.S. patent, Ser. No. 270,276, filed April 3, 1963, now Patent No. 3,232,742, by Stuart R. Zimmerley, Alexander E. Back, and Russell R. Beck, for "Dispersed Iron Product and Method of Producing Same." This material is easily ground to fine particle size in preparation for a subsequent leaching step, especially when it is initially placed in granulated condition by water quenching.

Sulfur is conveniently supplied by adding iron pyrite to the reduction furnace charge. In any event, the addition of a limited quantity of pyrite—from about 1.0 to 5.0%—is advantageous, because the iron sulfide provided thereby lowers the melting point of the metallic product.

Although the molybdenum cannot be extracted selectively from the metallic reduction product, there are various ways of recovering the molybdenum values. The only attractive method from a commercial standpoint presently known to us involves, first, extracting the iron by leaching such product with a mineral acid and, then, extracting the molybdenum from the acid residue by leaching such residue with a caustic. The resulting leach solution will carry the dissolved molybdenum values as a molybdate, and can be further processed as desired for the production of a variety of molybdenum compounds or the metal.

As an incident of the acid leaching, it is unavoidable that about half of the contained molybdenum is put into solution. By carrying out this leaching under substantially non-oxidizing conditions, the molybdenum is put into solution in a trivalent state.

One of the important aspects of the invention is the fact that the metallic iron in the reduction product serves as a reducing agent, as the leaching progresses, to maintain the dissolved molybdenum in its trivalent state, the dissolved iron in a ferrous state, and any non-sulfide copper in an insoluble, metallic state. Thus, it is important to avoid oxidation of the leach solution. When in its trivalent state, molybdenum in acid solution can be precipitated as the trihydroxide by neutralization of such solution. Moreover, ferrous iron remains soluble through the pH range required for molybdenum precipitation.

For neutralizing the acid solution to precipitate molybdenum as the trihydroxide, such solution is brought up to a pH of about 5.0. This may be accomplished either by the addition of an alkaline material, by the addition of metallic iron, or by carefully proportioning the quantities of reduction product and acid, etc. It is preferred, however, to accomplish this neutralization by the addition of ammonium hydroxide or an aqueous solution of ammonium carbonate or of an alkali metal hydroxide or carbonate. Basic materials forming insoluble sulfates, for example lime, could be used to effect the precipitation of molybdenum, but are not recommended because of precipitation of insoluble sulfates and possible precipitation of molybdenum in a form other than molybdic trihydroxide.

Solids in the so-neutralized pulp settle readily, especially when a flocculating agent is employed. Essentially all of the iron remains in solution and is removed, advantageously by conventional methods of countercurrent washing and filtration. The addition of limited amounts of acid to the wash solutions is beneficial so far as iron removal is concerned, but care should be used not to reduce the pH of the pulp below 3.0, which would result in redissolving the molybdenum.

Following removal of iron from the acid leach residue by the washing and filtering steps, the molybdenum is extracted by leaching with a caustic solution, i.e. ammonium hydroxide, an aqueous solution of ammonium carbonate, or an aqueous solution of an alkali metal hydroxide or carbonate. Sodium hydroxide is preferred over ammonium hydroxide because of greater and more selective extraction of molybdenum. It is preferred over other alkali metal hydroxide because of cost and availability.

It is highly desirable from the standpoint of molybdenum recovery that the washed, acid, leach residue be oxidized in preparation for the caustic leach. This can be accomplished either in solution or by drying and roasting. The latter procedure is preferred. In either event, a molybdate solution is obtained by the caustic leach and is separated from the leach residue, as by decantation or filtration, to yield a final product which may or may not be subjected to a purification procedure for the elimination of arsenic and phosphorus, depending upon the amounts present and what use is to be made of the product.

The process is described in detail hereinafter and is illustrated in the accompanying drawings with respect to specific procedures presently regarded as the best mode of carrying out the invention in commercial practice.

The single figure of the drawings represents a typical flow sheet for the process.

As illustrated, the slag from a reverberatory furnace treating copper concentrates containing molybdenum is preferably charged in molten condition directly into an electric arc reduction furnace, where it is subjected to reduction smelting at from about 1275° C. to 1400° C. in the presence of a carbonaceous reducing agent, such as finely divided coal, and of iron pyrite, preferably in the form of flotation concentrates derived as a by-product of the copper milling operation. The reducing agent is advantageously used on the basis of from about 1 to 2% by weight of the charge and the pyrite on the basis of about 1 to 5% in instances of slags containing from about 0.24 to 0.31% molybdenum.

Under these circumstances, from about 90 to 95% of the contained molybdenum values are recovered in a reduction product assaying from about 4.8 to 6.4% molybdenum. In addition, significant parts of the copper and precious metal values contained in the reverberatory slag fed to the reduction furnace are recovered in the reduction product.

It will be realized that the quantity of metallic reduction product obtained from each furnace charge will be quite small, about 5% of the tonnage of reverberatory slag treated. Accordingly, as a practical procedure, it is desirable to smelt a considerable quantity of slag and to skim the waste slag from the metallic reduction product that collects at the bottom of the furnace, leaving such product to accumulate over several runs until there is sufficient to make tapping thereof worthwhile.

In order to place the reduction product in an easily ground, granulated condition, the molten metallic material tapped from the reduction furnace is preferably passed directly into a granulating pit, where it is rapidly cooled by quenching with water. The resulting solid granules, made up of metallic particles dispersed throughout a matrix of metallic sulfide, are then passed to suitable grinding equipment, such as a ball mill, where they are reduced to a relatively fine particle size, desirably minus 35 mesh.

In accordance with preferred practice, this reduction product is made into a pulp by the addition of water and is run into a suitable leach tank. A quantity of mineral acid slightly in excess of the stoichiometric amount based on the iron content is added to the pulp, resulting in a pH of approximately 2.0 at the termination of the leaching period.

Sulfuric acid is preferred on account of its availability and low cost. Because of the presence of the large quantity of metallic iron, the leach is substantially non-oxidizing under ordinary circumstances and the dissolved molybdenum is maintained in its trivalent state.

The duration of the leaching period is determined largely by the size of grind and the temperature. By leaching a minus 35 mesh reduction product with sulfuric acid in an aqueous pulp for 24 hours at a temperature of from 18° to 25° C., over 99% of the iron is solubilized to obtain a leach solution containing approximately 90 grams per liter of iron.

It should be realized that the rate of extraction of iron is influenced considerably by the fineness of grind of the reduction product and by the leaching temperature. The finer the grind and the higher the temperature, the more rapid the rate of extraction of iron. Heat is evolved during the leaching and helps to maintain an elevated temperature.

The next step in the procedure is the separation of the dissolved iron from the molybdenum and other values contained by the pulp. As previously indicated, this involves raising the pH of the leached pulp to about 5.0 to precipitate that portion of the molybdenum values which are in solution. For this purpose, the leached pulp is passed into a neutralization tank, where the alkaline chemical, usually ammonium hydroxide, is added. A flocculant is also desirably added, to enhance settling of the precipitate and other solids as an acid residue.

The liquid phase of the leached and neutralized pulp (iron sulfate solution) is decanted as waste, and the solid phase (acid residue) is passed through a series of washing steps—ordinarily two are sufficient—and filtration to yield, as a filter cake, a final acid residue of low iron content. It is advantageous to add some acid to the water used for washing in order to better remove the iron sulfate solution, but it is important that the pH of the solution not go below 3.0; otherwise the molybdenum will be redissolved. Wash water from the first washing step is advantageously recycled to the leach tank, as indicated, while wash water from the second washing step and filtrate from the filtering step are advantageously recycled to the first washing step, as indicated.

It is desirable to dissolve and remove as much as possible of the contained iron from the metallic reduction product. Incomplete dissolution of iron lowers the extraction of molybdenum that can be obtained from the acid residue in subsequent caustic leaching. Incomplete removal of soluble iron salts from the acid residue increases the requirement for caustic reagent in such caustic leaching.

As previously mentioned, it is advantageous from the standpoint of the extent of recovery of molybdenum that the iron-free acid residue be oxidized in preparation for the next essential step in the molybdenum-recovery procedure, namely, the caustic leaching. Accordingly, the filter cake is charged into suitable roasting apparatus, where it is subjected to an oxidizing roast of from about 100° to 300° C.

The oxidized acid residue is put into a leach tank along with an aqueous solution of the caustic reagent, usually sodium hydroxide, to give a pH of about 12. The leaching is carried out at ambient temperature for a time period sufficient to dissolve the molybdenum, e.g., approximately two hours.

By using 1.6 pounds of NaOH per pound of molybdenum present in the acid leached material, in excess of 99% of the molybdenum can be extracted in the form of a sodium molybdate solution containing approximately 20 grams per liter of molybdenum.

The solid phase of the material in the leach tank is allowed to settle as a caustic residue and is passed through a filter. The liquid phase (sodium molybdate solution) is decanted and combined with the filtrate to provide a final product, which may be utilized for any purpose for which it is suited.

Essentially all of the copper and precious metal values recovered in the metallic reduction product are contained in the caustic leach residue. Thus, in experimental work, caustic leach residues have been obtained containing from 35 to 50% copper. For recovery of the copper and contained precious metal values, the caustic residue is returned to the copper smelting circuit.

It is preferable in some instances that the molybdate solution be purified before being marketed or utilized for the production of various molybdenum compounds or the metal. Copper reverberatory slags commonly contain small amounts of arsenic and phosphorus, which follow molybdenum through the recovery process of this invention and are present in the final molybdate solution. These impurities can be precipitated and removed from solution as magnesium ammonium arsenate and magnesium ammonium phosphate.

For this purpose, the molybdate solution (pH of about 12.0) is run into a purification tank and is acidified therein with a mineral acid, preferably sulfuric, to a pH of about 2.0. Magnesium oxide or a magnesium salt, such as the chloride or sulfate, is added in an amount equal to about one and one-half times the theoretical requirement for the precipitation of arsenic and phosphorus, and ammonium hydroxide or a basic ammonium salt is added to adjust the pH to approximately 9.0, whereby the arsenic and the phosphorus are precipitated from solution. The precipitate is allowed to settle, and the liquid phase (purified molybdate solution) is decanted.

The precipitate is filtered, and the filtrate is combined with the decanted molybdate solution to provide the final purified product of the process. Essentially complete removal of the arsenic and phosphorus is effected by this procedure, with negligible loss of molybdenum. The arsenate-phosphate cake will normally be considered waste.

Experimental data indicate that, from a reverberatory slag assaying 0.3% molybdenum, there can be obtained a sodium molybdate solution containing 92% of the molybdenum with only trace amounts of impurities, and that approximately 50% of the copper and a major part of the precious metal values in the slag can also be recovered as valuable by-products.

The following is a detailed example of an experimental run performed in the laboratory:

EXAMPLE

The charge for the reduction furnace consisted of reverberatory slag, pyrite concentrate, and fluid coke of the compositions indicated below:

*Copper reverberatory slag*

| | Percent |
|---|---|
| Fe | 35.4 |
| Mo | 0.31 |
| Cu | 0.47 |
| SiO$_2$ | 37.2 |

*Pyrite concentrate*

| | Percent |
|---|---|
| Fe | 34.2 |
| S | 39.3 |
| Cu | 0.65 |

*Fluid coke*

| | Percent |
|---|---|
| Fixed carbon | 90.8 |
| Volatile matter | 8.7 |
| Ash | 0.5 |

A 200-pound charge of the reverberatory slag was melted in a 250 kva. arc furnace, after which 4 pounds of pyrite concentrate and 3.2 pounds of fluid coke were added to the molten slag bath. Smelting temperatures in the range of 1275° to 1375° C. were maintained for a period of 3 hours to reduce a major part of the molybdenum from the slag. The reduced slag was skimmed from the furnace, and the smelting operation was repeated on a batch basis until a total of 3600 pounds of reverberatory slag had been treated. The accumulated metallic product was then tapped from the furnace and granulated in water to obtain a minus ⅜ inch granulated product. The granulated product was dried, and was ground to minus 35 mesh in a ball mill. By this procedure, a recovery of 89.8% of the molybdenum was obtained in a metallic reduction product assaying 6.42% molybdenum, 2.85% copper, 81.4% total iron, 72.9% metallic iron, and 4.6% sulfur.

In a typical example of the acid leaching process, a ground reduction product produced from copper reverberatory slag was treated. The minus 35 mesh product had the following analysis:

*Metallic reduction product*

| | Percent |
|---|---|
| Mo | 6.42 |
| Cu | 2.85 |
| Fe | 81.4 |
| Fe° | 72.9 |
| S | 4.6 |

A total of 69.4 pounds of the above product was treated in six batches with leaching, 2 stage decantation washing, and filtration being conducted as a counter-current operation. Iron was extracted from the metallic product with sulfuric acid by a 24-hour agitation leach. Acid addition was controlled to obtain a pulp pH of 2.0 at the end of the leaching cycle. The leached pulp was neutralized to pH 5.0 with ammonium hydroxide solution, a proprietary flocculating agent was added, and the pulp was allowed to settle. The pregnant solution, containing approximately 83 grams per liter of iron, was discarded, and the settled pulp was advanced through two stages of decantation washing. A pH of 4.0 was maintained in first stage washing while a pH of 3.0 was maintained in the second stage washing. The settled pulp from the second stage washing was filtered and dried. By this procedure 99.1% of the iron was extracted and 98.5% of the molybdenum was recovered in a product assaying 31.9% molybdenum, 14.1% copper, 3.6% iron and 8.6% sulfur.

A quantity of acid leach residue, comprising three of the above batches and assaying 33.1% Mo, 14.7% Cu, 3.0% Fe, 7.7% S, was oxidized by roasting at a temperature of 200° C. Molybdenum was extracted from a 4.4 pound sample of the oxidized acid residue with caustic soda solution in a 3-hour agitation leach. Caustic soda (NaOH) was used in an amount equal to 1.6 pounds per pound of contained molybdenum. The caustic leach residue was removed from the sodium molybdate solution by decantation and filtration. An extraction of 98.4% of the molybdenum was obtained in a sodium molybdate solution containing 16.3 grams per liter of molybdenum. Essentially all of the copper was recovered in the caustic residue, which assayed 38.8% copper and contained significant amounts of gold and silver.

A sodium molybdate solution containing 16.5 g./l. molybdenum, 1.35 g./l. arsenic, and 0.65 g./l. phosphorous was purified by the following procedure. The molybdate solution at an initial pH of 12.5 was acidified to pH 2.0 by the addition of sulfuric acid. Magnesium oxide was added in an amount equivalent to 2.14 grams per liter of solution. Ammonium hydroxide solution was added to increase the pH of the solution to 9.0. The precipitate obtained was removed by decantation and filtering. Essentially all of the molybdenum was recovered in a sodium molybdate solution of high purity having the following analysis:

*Purified sodium molybdate solution*

| | G./l. |
|---|---|
| As | <0.01 |
| P | <0.01 |
| Cu | <0.01 |
| Fe | 0.01 |
| | 0.01 |

The foregoing procedure for treating the metallic reduction product in which the molybdenum is concentrated is highly advantageous. Other less desirable procedures are based on conventional analytical techniques, see, for example, pages 314–325 of the book "Chemical Analysis of Iron and Steel" by Lundell, Hoffman, and Bright, published by John Wiley & Sons. With the preferred procedure, low cost reagents are employed, the contained metallic iron is used for a beneficial purpose, a useful molybdate solution of low impurity content is obtained, and the contained copper and precious metal values are recovered as a valuable residue.

It is preferred to draw off the molten metallic reduction product separately from the molten slag, but it is to be understood that the two may be drawn off simultaneously and solidified, the separation being carried out magnetically.

It is contemplated that the invention will be used primarily for the treatment of ferruginous molybdenum-bearing slags to recover the contained molybdenum in a useful and valuable product. However, if ferruginous molybdenum-bearing materials are to be treated for the production of commercial iron products, the selective smelting step of this process could be used advantageously to remove the molybdenum prior to the reduction of the major part of the iron and thereby to enable the production of commercial iron of low molybdenum content. If molybdenum were not removed from the iron source material prior to the reduction of iron, it would be present in the commercial iron product.

Whereas there is here illustrated and specifically described a certain preferred procedure which is presently regarded as the best mode of carrying out the invention, it should be understood that various changes can be made and other procedures adopted without departing from the inventive subject matter particularly pointed out and claimed hereinbelow.

We claim:

1. A process for recovering molybdenum values in usable form from ferruginous, molybdenum-bearing slags comprising:
   subjecting such a slag to a reduction smelting operation involving heating the material and a reducing agent to a smelting temperature, the quantity of reducing agent, the temperature, and the time of said smelting operation being established to effect reduction of the molybdenum preferentially to the iron and to form a residual slag and a metallic reduction product, the latter containing most of the molybdenum present in the original slag but little of the iron;
   separating said residual slag and said reduction product, and solidifying the latter;
   leaching the solidified reduction product with a mineral acid under reducing conditions to extract the iron in ferrous form, whereby part of the contained molybdenum is placed and maintained in solution in a trivalent state;
   raising the pH of the resulting pulp to about 5.0 to precipitate dissolved molybdenum as molybdenum trihydroxide, leaving the ferrous iron values in solution;
   separating the solid and liquid phases of the resulting pulp;
   leaching said solid phase with a caustic solution to extract the molybdenum content;
   and separating the resulting molybdate solution from the insoluble residue.

2. The process of claim 1, wherein sufficient iron pyrite is added to the slag for the reduction smelting operation to make the reduction product brittle by reason of the presence of metallic sulfides predominating in iron sulfide.

3. The process of claim 2, wherein the reduction product is solidified and granulated by water-quenching.

4. The process of claim 1, wherein the ferruginous, molybdenum-bearing slag is derived from a copper smelting operation, and is passed to the reduction smelting operation in a molten state.

5. The process of claim 1, wherein, prior to the leaching stage for the solidified reduction product, said product is size-reduced to a fine particle size of about minus 35 mesh; aqueous pulp is formed by adding water to the so-sized reduction product; and a mineral acid is added to said pulp in quantity slightly in excess of the stoichiometric amount for dissolving the iron content, but sufficient to yield a pH of approximately 2.0 at the termination of the leaching period.

6. The process of claim 1, wherein the pH of the leached pulp resulting from the acid leach of the reduction product is raised, as specified, by the addition to such pulp of an alkaline material selected from the group consisting of ammonium hydroxide, ammonium carbonate, and alkali metal hydroxides and carbonates.

7. The process of claim 1, wherein treating of the pulp resulting from the acid leach of the reduction product to free the solid phase from the liquid phase includes settling the precipitated molybdenum trihydroxide and decanting the liquid phase therefrom; washing the settled solid material; and filtering the washed solid material to provide a final acid residue substantially free of iron.

8. The process of claim 7, wherein the settled solids are washed with water, which is acidified but not to an extent that lowers the pH of the resulting liquid phase below 3.0.

9. The process of claim 1, wherein the solid phase to be leached with caustic is oxidized prior to being leached.

10. The process of claim 1, including as an additional step the recovery of metal values from the insoluble residue resulting from the caustic leaching.

11. The process of claim 1, including as an additional step the removal of arsenic and phosphorus from the molybdate solution.

12. A process for removing molybdenum values from ferruginous, molybdenum-bearing slags, comprising:
   subjecting such a slag to a reduction smelting operation involving heating the material and a reducing agent to a smelting temperature, the quantity of reducing agent, the temperature, and the time of said smelting operation being established to effect reduction of the molybdenum preferentially to the iron and to form a residual slag and a metallic reduction product, the latter containing most of the molybdenum present in the original slag but little of the iron;
   and separating said slag and said reduction product.

13. The process of claim 12, wherein sufficient iron pyrite is added to the slag for the reduction smelting operation to make the reduction product brittle by reason of the presence of metallic sulfides predominating in iron sulfide.

14. The process of claim 13, wherein the reduction product is solidified and granulated by water-quenching.

15. The process of claim 12, wherein the ferruginous, molybdenum-bearing slag is derived from a copper smelting operation, and is run directly to the reduction smelting operation in a molten state.

16. The process of claim 12, wherein the reduction product is further processed for the recovery of the contained molybdenum values.

17. A process of treating a metallurgical material which contains metallic iron and molybdenum values, for recovery of the molybdenum values, comprising:
   leaching the material with a mineral acid to extract the iron in ferrous form, whereby part of the contained molybdenum is placed and maintained in solution in a trivalent state;
   raising the pH of the resulting pulp to about 5.0 to precipitate dissolved molybdenum as molybdenum trihydroxide, leaving the ferrous iron values in solution;
   separating the solid and liquid phases of the resulting pulp;
   leaching said solid phase with a caustic solution to extract the molybdenum content;
   and separating the resulting molybdate solution from the insoluble residue.

18. The process of claim 17, wherein the metallurgical material is size-reduced to a fine particle size of about minus 35 mesh; aqueous pulp is formed from the so-sized reduction product; and a mineral acid is added to said pulp in quantity slightly in excess of the stoichiometric based upon the iron content, but sufficient to yield a pH of approximately 2.0 at the termination of the leaching period.

19. The process of claim 17, wherein the pH of the leached pulp is raised, as specified, by the addition to such pulp of an alkaline material selected from the group consisting of ammonium hydroxide, ammonium carbonate, and alkali metal hydroxides and carbonates.

20. The process of claim 17, wherein treating of the pulp to free the solid phase from the liquid phase includes settling the precipitated molybdenum trihydroxide and decanting the liquid phase therefrom; washing the settled solid material; and filtering the washed solid material to provide a final acid residue substantially free of iron.

21. The process of claim 20, wherein the settled solids are washed with water which is acidified but not to an extent that lowers the pH of the resulting liquid phase below 3.0.

22. The process of claim 17, wherein the solid phase to be leached with caustic is oxidized prior to being leached.

23. A process of treating a metallurgical material, which contains metallic iron and molybdenum values, for producing a molybdenum concentrate, said process comprising:
   leaching the material with a mineral acid under reducing conditions to extract the iron in ferrous form, whereby part of the contained molybdenum is placed and maintained in solution in a trivalent state;
   raising the pH of the resulting pulp to about 5.0 to precipitate dissolved molybdenum as molybdenum trihydroxide, leaving the ferrous iron values in solution;
   and separating the solid and liquid phases of the resulting pulp, leaving the solid phase as the molybdenum concentrate.

24. The process of recovering molybdenum values in the form of a molybdate solution from the molybdenum concentrate of claim 23, comprising:
   leaching said molybdenum concentrate with a caustic solution to extract the molybdenum content;
   and separating the resulting molybdate solution from the insoluble residue.

25. A process for recovering molybdenum, copper, and precious metal values from a copper reverberatory slag containing such values along with iron values, comprising:
   subjecting such a slag to a reduction smelting operation involving heating the material and a reducing agent to a smelting temperature, the quantity of reducing agent, the temperature, and the time of said smelting operation being established to effect reduction of the molybdenum preferentially to the iron and to form a residual slag and a metallic reduction product, the latter containing most of the molybdenum present in the original slag but little of the iron;
   separating said slag and said reduction product, and solidifying the latter;
   leaching the solidified reduction product with a mineral acid under reducing conditions to extract the iron in ferrous form, whereby part of the contained molybdenum is placed and maintained in solution in a trivalent state;
   raising the pH of the resulting pulp to about 5.0 to precipitate dissolved molybdenum as molybdenum trihydroxide, leaving the ferrous iron values in solution;
   separating the solid and liquid phases of the resulting pulp;
   leaching said solid phase with a caustic solution to extract the molybdenum content;
   separating the resulting molybdate solution from the insoluble residue;
   and treating said residue for the recovery of the contained copper and precious metal values.

26. The process of claim 25, wherein the solid phase to be leached with caustic is subjected to an oxidizing roast prior to being leached.

References Cited by the Examiner

UNITED STATES PATENTS

| | | | |
|---|---|---|---|
| 1,218,412 | 3/1917 | Kissock | 75—84 |
| 1,281,961 | 10/1918 | Holladay | 75—84 |
| 1,293,404 | 2/1919 | Giles | 23—140 |
| 1,403,477 | 1/1922 | Becket | 75—84 |
| 2,186,447 | 1/1940 | Brennan | 75—84 |
| 2,468,654 | 4/1949 | Brundell | 75—84 |
| 2,823,113 | 2/1958 | Porro | 23—140 |
| 2,965,447 | 12/1960 | Zimmerley | 23—140 |
| 2,992,095 | 7/1961 | Choi Li | 75—84 |
| 3,099,553 | 7/1963 | Aamot | 75—24 |

DAVID L. RECK, *Primary Examiner.*

BENJAMIN HENKIN, HYLAND BIZOT, *Examiners.*

H. W. CUMMINGS, N. F. MARKVA,
*Assistant Examiners.*